US012712358B2

(12) United States Patent
Munemoto et al.

(10) Patent No.: US 12,712,358 B2
(45) Date of Patent: Aug. 18, 2026

(54) VEHICLE INCLUDING CHARGING SYSTEM WITH Y-CAPACITORS, CHARGING SYSTEM OF VEHICLE, AND CONTROL DEVICE OF CHARGING SYSTEM

(71) Applicant: TOYOTA JIDOSHA KABUSHIKI KAISHA, Aichi-ken (JP)

(72) Inventors: Kentaro Munemoto, Kuwana (JP); Toru Ando, Obu (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 821 days.

(21) Appl. No.: 17/988,769

(22) Filed: Nov. 17, 2022

(65) Prior Publication Data

US 2023/0249570 A1 Aug. 10, 2023

(30) Foreign Application Priority Data

Feb. 4, 2022 (JP) ................................ 2022-016217

(51) Int. Cl.
*H02J 1/102* (2026.01)
*B60L 3/04* (2006.01)
(Continued)

(52) U.S. Cl.
CPC ................ *H02J 1/102* (2013.01); *B60L 3/04* (2013.01); *B60L 53/16* (2019.02); *B60L 53/22* (2019.02);
(Continued)

(58) Field of Classification Search
CPC .......... H02J 1/084; H02J 1/102; H02M 1/007; B60L 53/62; B60L 53/16; B60L 53/22; B60L 53/63
(Continued)

(56) References Cited

U.S. PATENT DOCUMENTS 3,499,165 A * 3/1970 Witt .......................... H02J 3/36 363/51
5,111,376 A * 5/1992 Mehl ......................... H02J 3/26 307/103
(Continued)

FOREIGN PATENT DOCUMENTS

JP H05276673 A * 10/1993 .............. B60L 53/14
JP 3214044 B2 * 10/2001 .............. B60L 53/14
(Continued)

OTHER PUBLICATIONS

ÂWhat is an “XY” rated safety capacitor, exactly?â Metacollin, Stackexchange, Publisched online Oct. 6, 2017, Access Online Jan. 10, 2026; electronics.stackexchange.com/questions/333029/what-is-an-xy-rated-safety-capacitor-exactly (Year: 2017).*

*Primary Examiner* — John T Trischler
(74) *Attorney, Agent, or Firm* — HAUPTMAN HAM, LLP

(57) ABSTRACT

A vehicle includes an inlet connected to a connector, a power accumulation device that accumulates power, two or more charging circuits that convert power from the inlet into direct current power having a predetermined voltage adapted for the power accumulation device, a switching system that switches between states where each of the charging circuits and the inlet are electrically connected and disconnected, a control device that controls the switching system, and a detection circuit that detects a maximum current value of charging power supplied from the outside. The control device controls the switching system such that the minimum number of charging circuits that can convert power having the maximum current value detected by the detection circuit is in a state of being electrically connected to the inlet.

19 Claims, 9 Drawing Sheets

(51) Int. Cl.

| | |
|---|---|
| ***B60L 53/16*** | (2019.01) |
| ***B60L 53/22*** | (2019.01) |
| ***B60L 53/62*** | (2019.01) |
| ***B60L 53/63*** | (2019.01) |
| ***H02J 1/08*** | (2006.01) |
| ***H02M 1/00*** | (2006.01) |
| *B60L 3/00* | (2019.01) |
| *B60L 53/14* | (2019.01) |
| *H02J 3/38* | (2006.01) |
| *H02J 3/46* | (2006.01) |
| *H02J 105/37* | (2026.01) |
| *H02M 3/158* | (2006.01) |

(52) U.S. Cl.

CPC ............... *B60L 53/62* (2019.02); *B60L 53/63* (2019.02); *H02J 1/084* (2020.01); *H02M 1/007* (2021.05); *B60L 3/0069* (2013.01); *B60L 53/14* (2019.02); *B60L 2210/30* (2013.01); *H02J 3/38* (2013.01); *H02J 3/46* (2013.01); *H02J 2105/37* (2026.01); *H02J 2207/20* (2020.01); *H02M 3/1582* (2013.01); *H02M 3/1584* (2013.01); *H02M 3/1586* (2021.05); *H02M 3/1588* (2013.01); *Y02T 90/14* (2013.01)

(58) Field of Classification Search

USPC ...................................... 320/137; 307/86, 87

See application file for complete search history.

(56) References Cited

U.S. PATENT DOCUMENTS 5,309,073 A * 5/1994 Kaneko .................. B60L 3/003 307/82
5,926,004 A * 7/1999 Henze .................... H02J 50/12 320/109
6,127,621 A * 10/2000 Simburger ........... B64G 1/2227 136/246
6,369,462 B1 * 4/2002 Siri ........................ H02J 3/381 307/51
6,396,167 B1 * 5/2002 Simburger ................ H02J 7/35 307/43
7,256,516 B2 * 8/2007 Buchanan ........... H01M 10/441 307/62
7,612,466 B2 * 11/2009 Skutt ........................ H02J 3/26 307/29
8,054,025 B2 * 11/2011 Oyobe ...................... H02J 7/02 180/65.21
8,178,996 B2 * 5/2012 Kuno .................... H02M 3/158 307/80
8,421,381 B2 * 4/2013 Fukatsu ................. B60L 53/24 324/426
8,466,655 B2 * 6/2013 Mitsutani ................ B60L 50/16 320/109
8,587,152 B2 * 11/2013 Martinelli ........... H02M 3/1584 323/284
8,618,767 B2 * 12/2013 Ishii ...................... B60L 3/0092 320/141
8,669,674 B2 * 3/2014 Van Dijk ................ G05F 1/563 307/31
8,698,346 B2 * 4/2014 Kamaga ................. B60K 6/365 320/128
8,774,997 B2 * 7/2014 Ichikawa ............. B60L 3/0069 320/109
8,829,722 B2 * 9/2014 Kusch .................. H02J 7/1423 307/82
9,187,000 B2 * 11/2015 Kuwano ............... H02J 7/0019
9,242,567 B2 * 1/2016 Kim .......................... H02J 7/02
9,325,170 B2 * 4/2016 Rozman .................... B60L 1/00
9,673,658 B2 * 6/2017 Jeong .................... H02J 7/0018
9,745,943 B2 * 8/2017 Vieillard ............ F02N 11/0862
9,755,561 B2 * 9/2017 Jojima ...................... B60L 3/04
9,798,367 B2 * 10/2017 Huang ...................... G06F 1/26
9,853,455 B1 * 12/2017 Casey .................. H02M 7/219
9,923,372 B2 * 3/2018 Ishigaki ................. H02J 3/322
10,069,327 B2 * 9/2018 Lee ................... H02J 7/007182
10,153,720 B2 * 12/2018 Nakayama ........... H05K 7/2089
10,250,063 B2 * 4/2019 Woo .................... H02J 7/00712
10,284,006 B2 * 5/2019 Toyoda .................. H02J 9/061
10,291,039 B2 * 5/2019 Cha ...................... H02J 7/0048
10,530,173 B2 * 1/2020 Sun .......................... H02J 5/00
10,637,258 B2 * 4/2020 Ando ..................... B60L 53/16
10,782,721 B2 * 9/2020 Erhart ...................... H02J 3/32
10,862,306 B2 * 12/2020 Graßl ..................... B60L 53/14
10,862,401 B2 * 12/2020 Jimenez Pino ......... B60L 53/20
10,919,407 B2 * 2/2021 Lu .......................... B60L 58/10
10,946,756 B2 * 3/2021 Malek .............. H02M 3/33584
11,014,680 B2 * 5/2021 Sun .................. H02M 3/33584
11,088,538 B2 * 8/2021 Sun ........................ H02M 1/36
11,091,041 B1 * 8/2021 Molina .................. B60L 53/24
11,161,424 B2 * 11/2021 Pfeilschifter .......... B60L 53/18
11,167,656 B2 * 11/2021 Shin ..................... B60L 3/0069
11,277,003 B2 * 3/2022 Marcinkiewicz ......... H02J 1/02
11,355,956 B1 * 6/2022 Ingemi .................... H02J 1/102
11,404,897 B2 * 8/2022 Yasoshima ........... H03K 17/302
11,440,423 B2 * 9/2022 Jimenez Pino ...... H03K 17/955
11,511,638 B2 * 11/2022 Millet ..................... B60L 53/22
11,652,423 B2 * 5/2023 Chizuwa ................ H02M 1/32 363/50
11,658,507 B2 * 5/2023 Yoon ........................ H02J 7/34 320/137
11,664,671 B2 * 5/2023 Chien .................... B60L 53/67 320/128
11,738,653 B2 * 8/2023 Zhu .................. H02M 7/53875 318/139
11,772,504 B2 * 10/2023 Sasu .................... H02J 7/0063 320/109
11,817,769 B2 * 11/2023 Zhu ...................... H02M 1/009
11,820,243 B2 * 11/2023 Ando ........................ H02J 7/02
12,128,777 B2 * 10/2024 Aoki ...................... B60L 53/16
12,157,388 B2 * 12/2024 Ando ........................ G06F 8/65
12,172,531 B2 * 12/2024 Watanabe ................. H02P 5/74
12,176,748 B2 * 12/2024 Sandgren ............. H02J 7/0024
12,202,368 B2 * 1/2025 Zhou ...................... B60L 53/14
12,206,281 B2 * 1/2025 Ingemi .................... H02J 9/061
12,248,006 B2 * 3/2025 Aurand .................. B60L 50/50
12,261,516 B2 * 3/2025 Zhu ........................ B60L 15/08
12,301,046 B2 * 5/2025 Öhman .................. B60L 58/24
12,381,411 B2 * 8/2025 Öhman ..................... H02J 7/02
2004/0130292 A1 * 7/2004 Buchanan .............. B60L 53/20 320/116
2007/0273216 A1 * 11/2007 Farbarik ................ H02J 1/001 307/86
2009/0189456 A1 * 7/2009 Skutt ........................ H02J 3/46 307/87
2010/0019734 A1 * 1/2010 Oyobe .................. B60K 6/445 320/162
2010/0026265 A1 * 2/2010 Kuno .................... H02M 3/158 323/284
2010/0106631 A1 * 4/2010 Kurayama ............. B60L 53/14 320/109
2010/0213896 A1 * 8/2010 Ishii ....................... B60L 53/24 320/109
2011/0181104 A1 * 7/2011 Kamaga ................. B60L 50/16 307/9.1
2011/0215743 A1 * 9/2011 Fukatsu ................. B60L 53/14 318/139
2011/0285350 A1 * 11/2011 Mitsutani ................ B60L 50/61 320/109
2012/0091958 A1 * 4/2012 Ichikawa ............. B60L 3/0069 320/109
2012/0098331 A1 * 4/2012 Krause ............. H02M 3/33573 307/9.1
2012/0153723 A1 * 6/2012 Van Dijk .................. G05F 1/56 307/31
2012/0242154 A1 * 9/2012 Martinelli ........... H02M 3/1584 307/80

(56) References Cited

U.S. PATENT DOCUMENTS

2013/0106195 A1* 5/2013 Kusch .................... B60L 53/22 307/82
2013/0271077 A1* 10/2013 Kim ........................ B60L 53/22 320/109
2014/0058577 A1* 2/2014 Erhart ....................... H02J 3/32 700/297
2014/0077731 A1* 3/2014 Kuwano ............... H02J 7/0014 320/126
2014/0210271 A1* 7/2014 Toyoda .................. H02J 9/061 307/66
2014/0217821 A1* 8/2014 Rozman .................... H02J 1/14 307/29
2014/0304528 A1* 10/2014 Huang ...................... G06F 1/26 713/300
2015/0130186 A1* 5/2015 Vieillard .............. B64D 27/357 290/31
2015/0256022 A1* 9/2015 Jeong .................... H02J 7/0018 320/108
2016/0190854 A1* 6/2016 Woo .................... H02J 7/00712 320/108
2016/0282832 A1* 9/2016 Ishigaki .................. H02J 3/381
2016/0285287 A1* 9/2016 Cha ....................... H02J 7/0048
2017/0063140 A1* 3/2017 Lee .......................... H02J 7/04
2017/0155350 A1* 6/2017 Jojima .................... B60L 50/51
2017/0305284 A1* 10/2017 Koh ........................ B60L 53/68
2018/0175774 A1* 6/2018 Nakayama ............. G01K 13/00
2018/0226813 A1* 8/2018 Ando ...................... B60L 53/12
2019/0031043 A1* 1/2019 Albanna ............. H02M 3/1582
2019/0089182 A1* 3/2019 Sun ......................... H02M 1/10
2019/0100321 A1* 4/2019 Sun ........................ B64D 27/34
2019/0106001 A1* 4/2019 Graßl ........................ H02J 7/02
2019/0143822 A1* 5/2019 Malek ....................... H02J 7/00 320/109
2019/0168628 A1* 6/2019 Pfeilschifter ........... B60L 53/18
2019/0348833 A1* 11/2019 Sun ....................... H02M 7/219
2020/0044458 A1* 2/2020 Yoon ......................... H02J 7/34
2020/0044464 A1* 2/2020 Sasu ..................... H02J 7/0044
2020/0122586 A1* 4/2020 Lu ........................... B60L 55/00
2020/0136520 A1* 4/2020 Jimenez Pino ......... B60L 53/20
2020/0177178 A1* 6/2020 Yasoshima ............ H02J 7/0013
2020/0180461 A1* 6/2020 Shin ........................ H02M 1/12
2021/0126547 A1* 4/2021 Chizuwa ............. H02M 7/1557
2021/0155103 A1* 5/2021 Zhu ......................... B60L 53/22
2021/0175724 A1* 6/2021 Chien ................... H02J 7/0013
2021/0218244 A1* 7/2021 Marcinkiewicz ...... H02H 9/045
2021/0245613 A1* 8/2021 Millet ................... H02M 7/797
2021/0408889 A1* 12/2021 Zhu ........................... H02J 7/06
2022/0032797 A1* 2/2022 Jimenez Pino ...... H03K 17/952
2022/0089049 A1* 3/2022 Ando ................ H02M 3/33573
2022/0181904 A1* 6/2022 Ingemi .................... H02J 9/062
2022/0200315 A1* 6/2022 Öhman ................... B60L 53/14
2022/0200319 A1* 6/2022 Öhman ................... B60L 58/24
2022/0200320 A1* 6/2022 Sandgren .......... H02J 7/007192
2022/0231537 A1* 7/2022 Hirota ....................... H02J 7/16
2022/0247207 A1* 8/2022 Ingemi .................... H02J 9/068
2022/0258640 A1* 8/2022 Ando .................... B60L 53/305
2022/0294357 A1* 9/2022 Channegowda .. H02M 3/33592
2023/0107766 A1* 4/2023 Aoki ....................... B60L 53/11 174/67
2023/0150375 A1* 5/2023 Watanabe ............... H02P 27/08 318/139
2023/0182603 A1* 6/2023 Zhou ....................... B60L 53/14 701/22
2023/0261504 A1* 8/2023 Zhang ................. H02J 7/00034 320/103
2023/0421042 A1* 12/2023 Zhu ....................... H02M 1/009
2024/0036078 A1* 2/2024 Aurand ..................... B60L 3/04
2024/0146087 A1* 5/2024 Li ......................... H02J 7/0047
2025/0047124 A1* 2/2025 Chen ..................... H02J 7/0013
2025/0083540 A1* 3/2025 Park ........................ B60L 53/11
2025/0121714 A1* 4/2025 Niedermayr ............ B60L 53/14
2025/0132586 A1* 4/2025 Kondo ...................... H02J 7/06
2025/0183671 A1* 6/2025 Takahashi ................. H02J 1/00

FOREIGN PATENT DOCUMENTS

JP 2011147308 A 7/2011
JP 2020114130 A 7/2020

* cited by examiner

VEHICLE 1
POWER SUPPLY FACILITY 300
POWER ACCUMULATION DEVICE
10
200
RECTIFI-CATION CIRCUIT
220
INVERTER
215
PFC CIRCUIT
210
FILTER CIRCUIT
205
206
207
208
80
ACL1
ACL2
70
71
72
73
76
77
340
341
342
343
346
347
330
180
CPLT
L1
L3
L2
R5
R6
R7
SW3
345
170
100
INPUT BUFFER
131
140
R2
R3
SW2
S2
160
150
R4
PISW
OUTPUT BUFFER
132
CPU
110
310
311
321
325
322
324
R20
STARTING DEVICE
323
CONTROL UNIT
326
327
320

FIG. 3

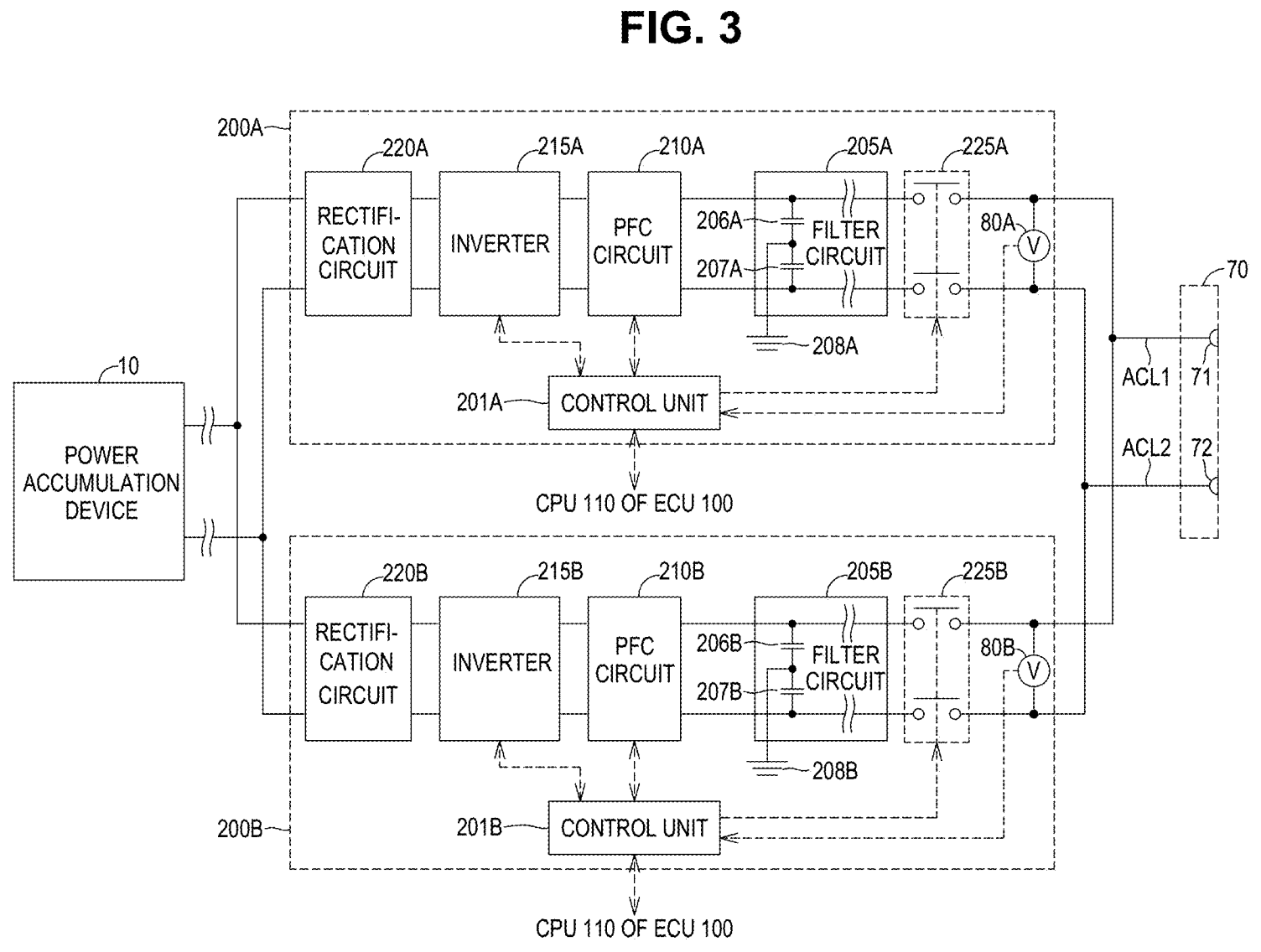

POWER ACCUMULATION DEVICE
10
200A
200B
RECTIFI-CATION CIRCUIT
220A
220B
INVERTER
215A
215B
PFC CIRCUIT
210A
210B
FILTER CIRCUIT
205A
205B
206A
207A
208A
206B
207B
208B
CONTROL UNIT
201A
201B
CPU 110 OF ECU 100
225A
225B
80A
80B
V
ACL1
ACL2
70
71
72

VEHICLE INCLUDING CHARGING SYSTEM WITH Y-CAPACITORS, CHARGING SYSTEM OF VEHICLE, AND CONTROL DEVICE OF CHARGING SYSTEM

CROSS-REFERENCE TO RELATED APPLICATION

This application claims priority to Japanese Patent Application No. 2022-016217 filed on Feb. 4, 2022, incorporated herein by reference in its entirety.

BACKGROUND

1. Technical Field

The present disclosure relates to a vehicle, a charging system of the vehicle, and a control device of the charging system, and, in particular, to a vehicle chargeable from the outside, a charging system of the vehicle, and a control device of the charging system.

2. Description of Related Art

A technique for mounting a plurality of in-vehicle chargers in order to secure charging power has been known (see, for example, Japanese Unexamined Patent Application Publication No. 2011-147308 (JP 2011-147308 A)).

SUMMARY

A Y-capacitor may be connected between each of two power lines and the ground to filter out common mode noise transmitted in the same direction as current on the two power lines connected to a charger. In a vehicle including a plurality of chargers provided in parallel as in JP 2011-147308 A, when the Y-capacitors are provided, they are provided in the chargers. As such, when capacity of the Y-capacitors increases, leakage current may increase.

The present disclosure provides a vehicle, a charging system of the vehicle, and a control device of the charging system that can restrict leakage current even when a Y-capacitor is provided.

A first aspect of the present disclosure is a vehicle chargeable from an outside. The vehicle includes an inlet configured to be connected to a connector of a cable that supplies power from the outside, a power accumulation device configured to accumulate power, two or more charging circuits configured to convert power from the inlet into direct current power having a predetermined voltage adapted for the power accumulation device, a switching system configured to switch between states where each of the charging circuits and the inlet are electrically connected and disconnected, a control device configured to control the switching system, and a detection circuit configured to detect a maximum current value of charging power supplied from the outside. The control device is configured to control the switching system such that the minimum number of charging circuits that can convert power having the maximum current value detected by the detection circuit is in a state of being electrically connected to the inlet.

With such a configuration, the minimum number of charging circuits that convert the charging power having the maximum current value supplied from the outside becomes the state of being electrically connected to the inlet. For this reason, it is possible to restrict leakage current even in a case where a Y-capacitor is provided in the power line connected to the charging circuit, as compared with a case where all of the charging circuits are electrically connected to the inlet. As a result, it is possible to provide a vehicle that can restrict leakage current even when the Y-capacitor is provided.

In the first aspect, the vehicle may further include a plurality of chargers each including one of the charging circuits. With such a configuration, since an existing charger can be used, it is possible to shorten a development period.

In the first aspect, the vehicle may further include a charger including all of the charging circuits. With such a configuration, it is possible to include an appropriate charger according to the vehicle.

In the first aspect, the switching system may include a plurality of relays provided respectively corresponding to the charging circuits and configured to switch between states where each of the charging circuits and the inlet are electrically connected and disconnected. With such a configuration, it is possible to make frequency of use of each of the charging circuits approximately the same.

In the first aspect, one of the charging circuits may be a main charging circuit and the others may be secondary charging circuits. The switching system may include one or more relays provided respectively corresponding to the secondary charging circuits and configured to switch between the states where each of the charging circuits and the inlet are electrically connected and disconnected. With such a configuration, it is possible to eliminate a need to provide a relay in the main charging circuit. As a result, it is possible to reduce a cost of providing the relay.

A second aspect of the present disclosure is a charging system of a vehicle chargeable from an outside. The vehicle includes an inlet configured to be connected to a connector of a cable that supplies power from the outside, and a power accumulation device configured to accumulate power. The charging system includes two or more charging circuits configured to convert power from the inlet into direct current power having a predetermined voltage adapted for the power accumulation device, a switching system configured to switch between states where each of the charging circuits and the inlet are electrically connected and disconnected, a control device configured to control the switching system, and a detection circuit configured to detect a maximum current value of charging power supplied from the outside. The control device is configured to control the switching system such that the minimum number of charging circuits that can convert power having the maximum current value detected by the detection circuit is in a state of being electrically connected to the inlet.

With such a configuration, it is possible to provide the charging system of the vehicle that can restrict leakage current even when the Y-capacitor is provided.

A third aspect of the present disclosure is a control device of a charging system of a vehicle chargeable from an outside. The vehicle includes an inlet configured to be connected to a connector of a cable that supplies power from the outside, and a power accumulation device configured to accumulate power. The charging system includes two or more charging circuits configured to convert power from the inlet into direct current power having a predetermined voltage adapted for the power accumulation device, a switching system configured to switch between states where each of the charging circuits and the inlet are electrically connected and disconnected, and a detection circuit configured to detect a maximum current value of charging power supplied from the outside. The control device includes an electronic control unit configured to control the switching system such that the minimum number of charging circuits that can convert power having the maximum current value detected by the detection circuit is in a state of being electrically connected to the inlet.

With such a configuration, it is possible to provide the control device of the charging system that can restrict leakage current even when the Y-capacitor is provided.

With each aspect of the present disclosure, it is possible to provide a vehicle, a charging system of the vehicle, and a control device of the charging system that can restrict leakage current even when a Y-capacitor is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating one example of a circuit configuration when a plurality of chargers is provided in parallel;

DETAILED DESCRIPTION OF EMBODIMENTS

First Embodiment

Figure 1:
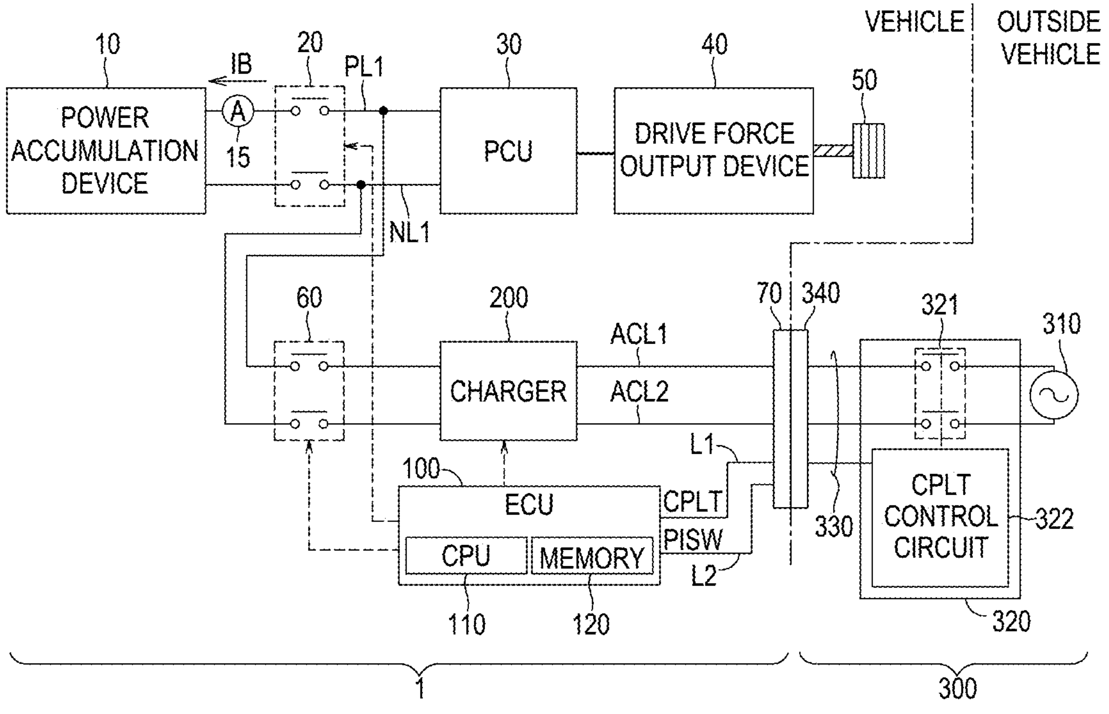
FIG. 1 is a diagram illustrating one example of an overall configuration of a charging system including a charging device according to the present embodiment.

Hereinafter, embodiments of the present disclosure will be described in detail with reference to the drawings. The same or corresponding parts in the drawings are denoted by the same reference signs, and the description thereof will not be repeated.

Configuration of Vehicle and Power Supply Facility

FIG. 1 is a diagram illustrating an example of an overall configuration of a charging system including a charging device according to the present embodiment. With reference to FIG. 1, the charging system includes a vehicle 1 and a power supply facility 300. The power supply facility 300 is a facility used for supplying alternating current power to the vehicle 1. An example where the vehicle 1 according to the present embodiment is a battery electric vehicle (hereinafter, also referred to as a "BEV") will be described.

The vehicle 1 includes a power accumulation device 10, a current sensor 15, a system main relay (hereinafter, also referred to as an "SMR") 20, a power control unit (hereinafter, also referred to as a "PCU") 30, a drive force output device 40, and drive wheels 50. Further, the vehicle 1 further includes an inlet 70, a charging relay 60, and a charger 200.

The power accumulation device 10 is a rechargeable direct current power source, and is composed of, for example, a secondary battery, such as a nickel-metal hydride battery or a lithium-ion battery. The power accumulation device 10 accumulates power generated in the drive force output device 40 in addition to power supplied from an alternating current power source 310 of the power supply facility 300. As the power accumulation device 10, a large-capacity capacitor can also be employed.

A current sensor 15 detects charging current IB input to and output from the power accumulation device 10 and outputs a detection result to an ECU 100.

The SMR 20 is provided between the power accumulation device 10 and power lines PL1, NL1. The SMR 20 is a relay used for electrically connecting/disconnecting the power accumulation device 10 to/from the power lines PL1, NL1.

The PCU 30 collectively indicates power conversion devices used for receiving power from the power accumulation device 10 and driving the drive force output device 40. For example, the PCU 30 includes an inverter used for driving a motor included in the drive force output device 40, a converter that boosts power output from the power accumulation device 10, or the like.

The drive force output device 40 collectively indicates devices used for driving the drive wheels 50. The drive force output device 40 includes, for example, a motor that drives the drive wheels 50. Further, the drive force output device 40 generates power by the motor that drives the drive wheels 50 at a time when the vehicle is braked, and outputs the generated power to the PCU 30.

The inlet 70 is electrically connected to input lines ACL 1, ACL 2 of the charger 200. The inlet 70 is configured to be connectable to a connector 340 of the power supply facility 300. Further, signal lines L1, L2 are provided between the inlet 70 and the ECU 100. The signal line L1 is a signal line used for transferring a pilot signal CPLT used for exchanging predetermined information between the vehicle 1 and the power supply facility 300. The signal line L2 is a signal line used for transferring a connector connection signal PISW indicating a connection state between the inlet 70 and the connector 340. The pilot signal CPLT and the connector connection signal PISW will be described below.

The charging relay 60 is a relay used for electrically connecting/disconnecting the charger 200 to/from the power lines PL1, NL1. The charging relay 60 switches between open and closed states based on a control signal from the ECU 100.

The charger 200 is electrically connected to the power accumulation device 10 via the charging relay 60. The charger 200 converts power input to the inlet 70 into power having a charging voltage of the power accumulation device 10 according to a command from the ECU 100. The power converted by the charger 200 is supplied to the power accumulation device 10 via the charging relay 60, and the power accumulation device 10 is charged.

The ECU 100 includes a central processing unit (CPU) 110, a memory (a random access memory (RAM) and a read-only memory (ROM)) 120, and an input/output buffer (not shown) for inputting/outputting various signals. The CPU 110 develops, in the RAM, a program stored in the ROM and executes it. The program stored in the ROM describes processes to be executed by the CPU 110. The ECU 100 executes predetermined arithmetic processing by the CPU 110 based on various signals input from the input/output buffer and information stored in the memory 120 according to the program, and, based on the arithmetic result, controls each device (for example, the SMR 20, the PCU 30, the charging relay 60, and the charger 200) such that the vehicle 1 becomes a desired state. These controls are not limited to processing by software, and can also be processed by constructing dedicated hardware (an electronic circuit).

The power supply facility 300 includes an alternating current power source 310 outside the vehicle, electric vehicle supply equipment (EVSE) 320, and a charging cable 330. The connector 340 configured to be connectable to the inlet 70 of the vehicle 1 is provided at a tip of the charging cable 330.

The alternating current power source 310 is composed of, for example, a commercial system power source, but is not limited thereto, and various power sources can be applied.

The EVSE 320 controls supply/interruption of alternating current power from the alternating current power source 310 to the vehicle 1 via the charging cable 330. The EVSE 320 is provided in, for example, a charging station used for supplying power to the vehicle 1. The EVSE 320 satisfies, for example, required specifications of the SAE Electric Vehicle Conductive Charge Coupler ("SAEJ1772") standard. The EVSE 320 is not limited to being provided in the charging station, and for example, a charging circuit interrupt device (CCID) box having a function of the EVSE 320 may be provided in the charging cable. In this case, for example, an outlet plug provided at one end of the charging cable (a side opposite to the connector 340) is connected to the alternating current power source 310.

The EVSE 320 includes the CCID 321 and a CPLT control circuit 322. The CCID 321 is a relay provided in a power supply path from the alternating current power source 310 to the vehicle 1 and controlled by the CPLT control circuit 322.

The CPLT control circuit 322 generates the pilot signal CPLT to be communicated to the ECU 100 of the vehicle 1 and outputs the pilot signal CPLT to the ECU 100 via a dedicated signal line included in the charging cable 330. Potential of the pilot signal CPLT is manipulated in the ECU 100. The CPLT control circuit 322 controls the CCID 321 based on the potential of the pilot signal CPLT. In other words, by manipulating the potential of the pilot signal CPLT in the ECU 100, the CCID 321 can be remotely operated from the ECU 100.

Figure 2:
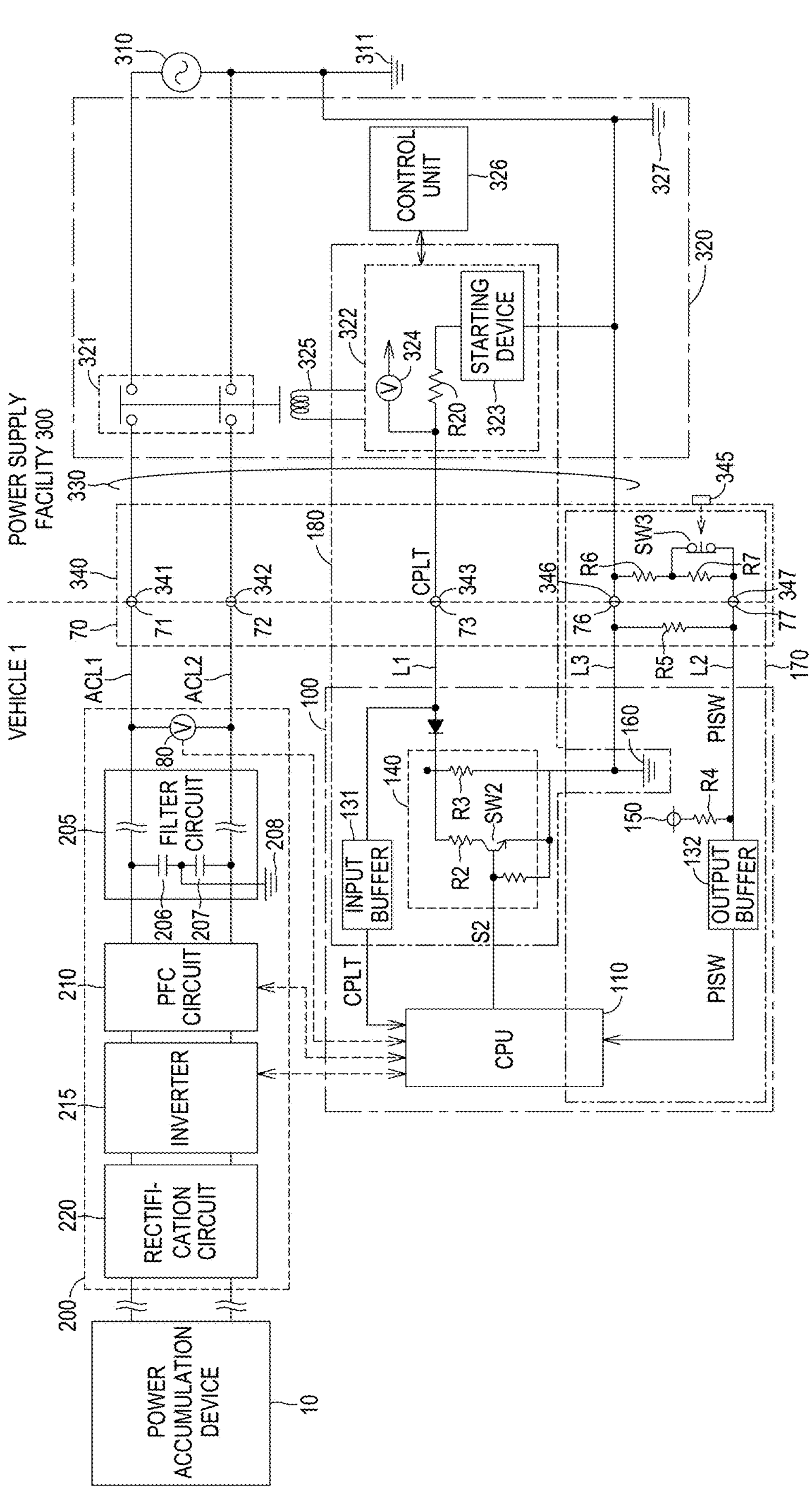
FIG. 2 is a diagram illustrating one example of a circuit configuration of an ECU and a charger of a vehicle, and a power supply facility.

FIG. 2 is a diagram illustrating an example of a circuit configuration of the ECU 100, the charger 200, and the power supply facility 300 of the vehicle 1. With reference to FIG. 2, the charger 200 includes a filter circuit 205, a power factor correction (PFC) circuit 210, an inverter 215, and a rectification circuit 220. The filter circuit 205, the PFC circuit 210, the inverter 215, and the rectification circuit 220 are connected in this order to a power path from the inlet 70 to the power accumulation device 10.

The filter circuit 205 filters out noise contained in alternating current power input from the inlet 70 and outputs the alternating current power from which noise has been filtered out to the PFC circuit 210.

The PFC circuit 210 converts alternating current power supplied from the filter circuit 205 into direct current power based on a control signal from the ECU 100 and outputs the direct current power to the inverter 215.

The inverter 215 converts direct current power received from the PFC circuit 210 into alternating current power based on a control signal from the ECU 100 and outputs the alternating current power to the rectification circuit 220. The inverter 215 is composed of, for example, a single-phase bridge circuit.

The rectification circuit 220 converts alternating current power output from the inverter 215 into direct current power and outputs the direct current power. The direct current power output from the rectification circuit 220 is supplied to the power accumulation device 10.

The charger 200 further includes a voltage sensor 80. The voltage sensor 80 detects voltage VIN input to the filter circuit 205. The voltage VIN can be regarded as voltage applied to the inlet 70 from the power supply facility 300.

Pilot Signal and Connector Connection Signal

The EVSE 320 of the power supply facility 300 further includes an electromagnetic coil 325 and a control unit 326, in addition to the CCID 321 and the CPLT control circuit 322. The CPLT control circuit 322 includes an oscillator 323, a resistor R20, and a voltage sensor 324.

The CCID 321 (hereinafter, also referred to as a "CCID relay 321") is provided on the power supply path to the vehicle 1 and controlled by the CPLT control circuit 322. When the CCID relay 321 is switched to an open state, the power supply path is disconnected, and when the CCID relay 321 is switched to a closed state, it becomes a state of being capable of supplying power from the alternating current power source 310 to the vehicle 1 (the charger 200) via the charging cable 330.

The CPLT control circuit 322 outputs the pilot signal CPLT to the ECU 100 via a terminal 343 on the connector 340 side and a terminal 73 on the inlet 70 side connected to the terminal 343. As described above, the potential of the pilot signal CPLT is manipulated by the ECU 100, and the pilot signal CPLT is used as a signal for remotely operating the CCID relay 321 from the ECU 100. The CPLT control circuit 322 controls the CCID relay 321 based on the potential of the pilot signal CPLT. Further, the pilot signal CPLT is used as a signal for sending, from the CPLT control circuit 322 to the ECU 100, a notification of rated current of the charging cable 330.

The control unit 326 includes, for example, a CPU, a memory, and an input/output buffer (none of which are shown), inputs and outputs signals of various sensors and the CPLT control circuit 322, and controls an operation of the CPLT control circuit 322.

When the connector 340 is not connected to the inlet 70, the oscillator 323 outputs a non-oscillating pilot signal CPLT having potential of V0. When the connector 340 is connected to the inlet 70, the potential of the pilot signal CPLT becomes V1 lower than V0 (V0>V1) and a preparation for supplying power to the vehicle 1 is completed in the EVSE 320, the oscillator 323 oscillates the pilot signal CPLT at a regulated frequency (for example, 1 kHz) and duty cycle.

The duty cycle of the pilot signal CPLT is set according to the rated 15 current of the charging cable 330. The ECU 100 of the vehicle 1 can detect the rated current of the charging cable 330 based on the duty cycle of the pilot signal CPLT received from the CPLT control circuit 322 via the signal line L1.

When the potential of the pilot signal CPLT drops to V2 (V1>V2), which is even lower than V1, the CPLT control circuit 322 supplies current to the electromagnetic coil 325. When current is supplied from the CPLT control circuit 322 to the electromagnetic coil 325, the electromagnetic coil 325 generates an electromagnetic force and the CCID relay 321 is switched to the closed state. As such, power supply voltage (voltage from the alternating current power source 310) is applied to terminals 71, 72 on the inlet 70 side respectively connected to terminals 341, 342 via the terminals 341, 342 on the connector 340 side of the charging cable 330.

In the connector 340, resistors R6, R7, and a switch SW3 are provided. The resistors R6, R7 and the switch SW3 compose a circuit that detects the connection state between the connector 340 and the inlet 70, together with a power source node 150 provided in the ECU 100 of the vehicle 1, a pull-up resistor R4, and a resistor R5 provided in the inlet 70.

The resistors R6, R7 are connected in series between the signal line L2 and a ground line L3. The switch SW3 is connected in parallel with the resistor R7. The switch SW3 is interlocked with a press button 345 provided on the connector 340. When the press button 345 is not pressed, the switch SW3 is switched to the closed state, and when the press button 345 is pressed, the switch SW3 is switched to the open state. The resistor R5 is connected between the signal line L2 and the ground line L3 in the inlet 70.

When the connector 340 is not connected to the inlet 70, a signal having potential (V3) decided by voltage of the power source node 150, the pull-up resistor R4, and the resistor R5 is generated on the signal line L2 as a connector connection signal PISW. In a state where terminals 346, 347 on the connector 340 side are connected to terminals 76, 77 on the inlet 70 side, which are respectively connected to the terminals 346, 347 (the press button 345 is not operated), a signal having potential (V4) decided by the voltage of the power source node 150, the pull-up resistor R4, and the resistors R5, R6 is generated on the signal line L2 as the connector connection signal PISW. When the press button 345 is operated in the state where the connector 340 is connected to the inlet 70, a signal having potential (V5) decided by voltage of the power source node 150, the pull-up resistor R4, and the resistors R5 to R7 is generated on the signal line L2 as the connector connection signal PISW. Therefore, the ECU 100 can detect the connection state between the connector 340 and the inlet 70 by detecting the potential of the connector connection signal PISW.

The ECU 100 further includes a resistor circuit 140 and input buffers 131, 132, in addition to the power source node 150 and the pull-up resistor R4. The resistor circuit 140 is a circuit used for manipulating the potential of the pilot signal CPLT to be communicated via the signal line L1. The resistor circuit 140 includes pull-down resistors R2, R3 and a switch SW2. The pull-down resistor R2 and the switch SW2 are connected in series between the signal line L1, via which the pilot signal CPLT is to be communicated, and vehicle ground 160. The pull-down resistor R3 is connected between the signal line L1 and the vehicle ground 160. The switch SW2 is turned on/off according to a signal S2 from the CPU 110.

In the state where the resistor circuit 140 is electrically connected to the CPLT control circuit 322 via the signal line L1, the inlet 70, and the connector 340, when the switch SW2 is turned off (the interrupted state), the potential of the pilot signal CPLT becomes potential (V1) decided by the pull-down resistor R3. When the switch SW2 is turned on (a conducting state), the potential of the pilot signal CPLT becomes potential (V2) decided by the pull-down resistors R2, R3.

The input buffer 131 is a circuit used for capturing the pilot signal CPLT from the signal line L1 into the CPU 110. The input buffer 132 is a circuit used for capturing the connector connection signal PISW from the signal line L2 into the CPU 110.

The CPU 110 receives the pilot signal CPLT from the input buffer 131 and the connector connection signal PISW from the input buffer 132. The CPU 110 detects the potential of the connector connection signal PISW and detects the connection state between the connector 340 and the inlet 70 based on the potential of the connector connection signal PISW.

When the connector 340 is connected to the inlet 70, the CPU 110 requests the power supply facility 300 to supply power and to stop the power supply by controlling the signal S2 (the switch SW2) and manipulating the potential of the pilot signal CPLT. Specifically, the CPU 110 requests the power supply facility 300 to supply power by turning on the signal S2 and changing the potential of the pilot signal CPLT from V1 to V2. Further, the CPU 110 requests the power supply facility 300 to stop the power supply by turning off the signal S2 and changing the potential of the pilot signal CPLT from V2 to V1.

When the signal S2 is turned on and the CCID relay 321 is switched to the closed state in the EVSE 320, power supply voltage is given from the power supply facility 300 to the charger 200 via the inlet 70. Then, after completion of predetermined charging preparation processing, the CPU 110 outputs a control signal to the charger 200. As such, the charger 200 operates and external charging is executed by the alternating current power source 310.

As illustrated in FIG. 2, in order to filter out common mode noise transmitted in the same direction as current on the input lines ACL1, ACL2, which are two power lines connected to the charger 200, Y-capacitors 206, 207 may be connected between each of the two input lines ACL1, ACL2 and ground 208.

In order to increase chargeable power, it is conceivable to provide a plurality of chargers 200 illustrated in FIG. 2 in parallel. FIG. 3 is a diagram illustrating an example of a circuit configuration when the plurality (here, two) of chargers 200A, 200B is provided in parallel. With reference to FIG. 3, a basic configuration of the chargers 200A, 200B is the same as that of the charger 200 described above. For example, when each of the chargers 200A and 200B can handle power rated at 3.3 kW, the two chargers 200A, 200B can together handle 6.6 kW of power by being provided in parallel.

As such, when the Y-capacitors are provided in the vehicle 1 in which the chargers 200A, 200B are provided in parallel, Y-capacitors 206A, 207A and Y-capacitors 206B, 207B are provided in the chargers 200A, 200B, respectively. As such, since total capacity of the Y-capacitors 206A, 207A, 206B, 207B is increased as compared with a case where the chargers are not provided in parallel, leakage current may increase.

The power supply facility 300 may have a function of detecting an abnormality using a zero-phase current transformer (hereinafter, referred to as a "ZCT"), and, when an abnormality is detected, disconnecting the CCID relay 321 and stopping the power supply. In this case, when the leakage current from the Y-capacitors 206A, 207A, 206B, 207B becomes large during the charging, the power supply facility 300 may erroneously detect an occurrence of an abnormality and the charging cannot be executed.

Therefore, the vehicle 1 includes charging circuit relays 225A, 225B that switch between states where each of the chargers 200A, 200B and the inlet 70 are electrically connected and disconnected, control units 201A, 201B that control the charging circuit relays 225A, 225B, respectively, and a vicinity detection circuit 170 that detects a maximum current value of charging power supplied from the outside. The control devices 201A, 201B control the charging circuit relays 225A, 225B such that the minimum number of chargers 200A, 200B that can convert the maximum current value of power detected by the vicinity detection circuit 170 becomes the state of being electrically connected to the inlet 70.

As such, the minimum number of chargers 200A, 200B that can convert the charging power having the maximum current value supplied from the outside becomes the state of being electrically connected to the inlet 70. For this reason, it is possible to restrict leakage current even in the case where the Y-capacitors 206A, 207A, 206B, 207B are provided in the power lines connected to the chargers 200A, 200B, as compared with the case where all of the chargers 200A, 200B are electrically connected to the inlet 70.

With reference to FIG. 2 again, the vicinity detection circuit 170 includes the switch SW3 and the resistors R6, R7 on the power supply facility 300 side that are described above, and the pull-up resistor R4, the resistor R5, the power source node 150, and the input buffer 132 on the vehicle 1 side, and the CPU 110. In the power supply facility 300, the maximum power that can be supplied is determined in advance at a time of designing. In other words, since supply voltage from the power supply facility 300 is regulated to be a constant value (230 V in a case of the GB/T standard), the maximum current value of power supplied to the vehicle 1 via the charging cable 330 and the connector 340 is determined in advance for each power supply facility 300.

The GB/T standard (GB/T18487.1) regulates the maximum current value (capacity of the charging cable 330) that can be supplied from the power supply facility 300 to be any one of 10 A, 16 A, 32 A, and 63 A. Further, resistor values of the resistors R6, R7 on the power supply facility 300 side are regulated to be different values for each maximum current value. For this reason, as described above, when the connector 340 is connected to the inlet 70 and the press button 345 is not pressed, the potential V4 of the connector connection signal PISW varies for each maximum current value. The resistor values of the pull-up resistor R4 and the resistor R5 on the vehicle 1 side are determined to be constant values.

Therefore, from the potential V4, the vehicle 1 can detect which of 10 A, 16 A, 32 A, and 63 A is the maximum current value that can be supplied from the power supply facility 300.

As such, from a range of the potential V4 of the connector connection signal PISW input from the input buffer 132, the CPU 110 can detect the maximum current value that can be supplied by the power supply facility 300.

With reference to FIG. 3 again, the charging circuit relay 225A of the charger 200A is provided between a voltage sensor 80A and a filter circuit 205A. A charging circuit relay 225B of the charger 200B is provided between a voltage sensor 80B and a filter circuit 205B. The control unit 201A controls the charging circuit relay 225A, a PFC circuit 210A, and an inverter 215A according to instructions from the CPU 110 of the ECU 100, and sends a detection value of the voltage sensor 80A to the CPU 110. The control unit 201B controls the charging circuit relay 225B, a PFC circuit 210B, and an inverter 215B according to instructions from the CPU 110 of the ECU 100, and sends a detection value of the voltage sensor 80B to the CPU 110.

Here, it is assumed that each part of the chargers 200A, 200B is controlled by the control units 201A, 201B according to instructions from the CPU 110 of the ECU 100, respectively. In other words, it is assumed that each part of the chargers 200A, 200B is indirectly controlled by the ECU 100. However, the present disclosure is not limited thereto, and each part of the chargers 200A, 200B may be directly controlled by the ECU 100.

Figure 4:
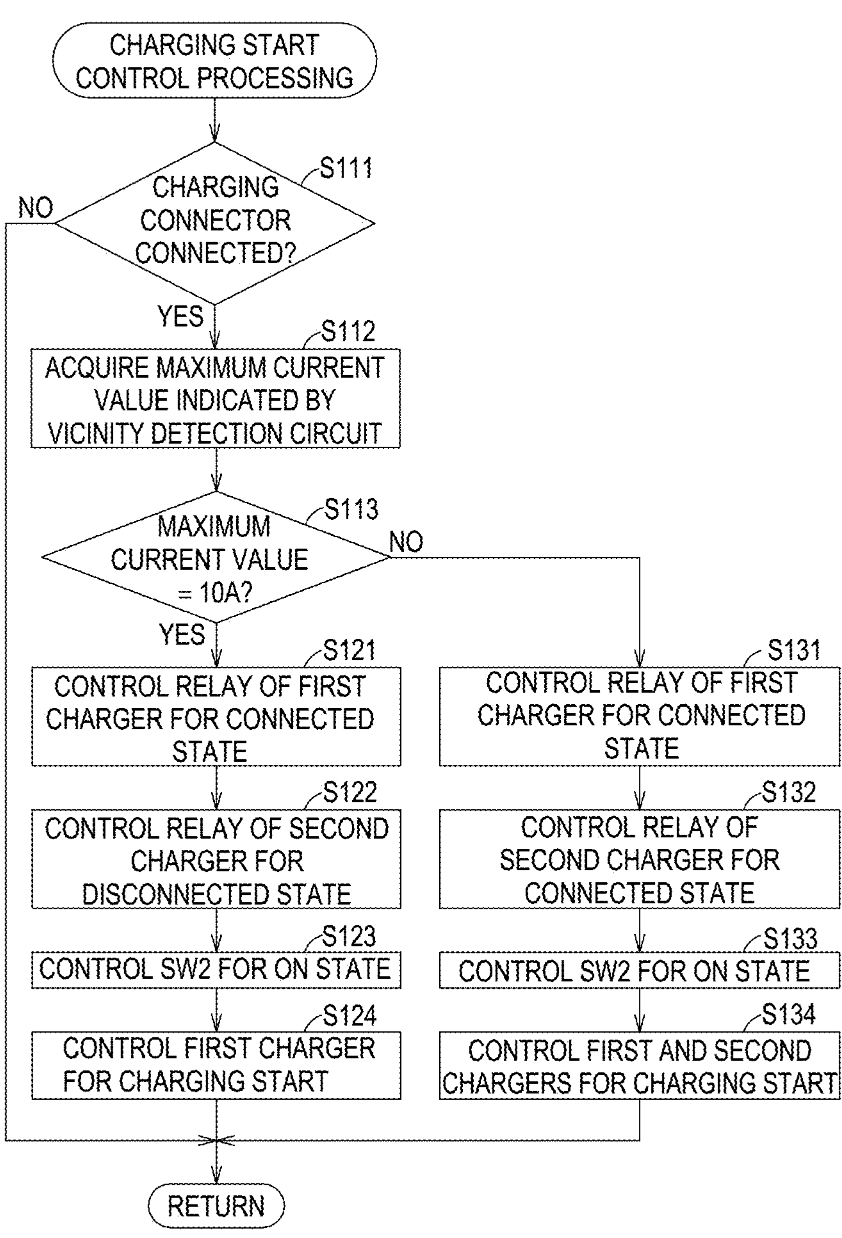
FIG. 4 is a flowchart illustrating a flow of charging start control processing in a first embodiment.

FIG. 4 is a flowchart illustrating a flow of charging start control processing in a first embodiment. With reference to FIG. 4, the charging start control processing is summoned from an upper-level process at predetermined intervals and executed by the CPU 110 of the ECU 100.

The CPU 110 of the ECU 100 determines whether the connector 340 of the charging cable 330 is connected to the inlet 70 (step S111). Upon determining that the connector 340 is not connected (NO in step S111), the CPU 110 returns the process to be executed to the upper-level process, which is a source of summoning, of the charging start control processing.

On the other hand, upon determining that the connector 340 is connected (YES in step S111), the CPU 110 acquires the maximum current value that can be supplied by the power supply facility 300, which is indicated by the potential V4 of the PISW signal input from the vicinity detection circuit 170 (step S112).

Then, the CPU 110 determines whether the acquired maximum current value is 10 A (step S113). Upon determining that the maximum current value is 10 A (YES in step S113), the CPU 110 sends, to the control unit 201A, an instruction for controlling the charging circuit relay 225A of a first charger 200A such that it is switched to the connected state (step S121).

Next, the CPU 110 sends, to the control unit 201B, an instruction for controlling the charging circuit relay 225B of a second charger 200B such that it is switched to the disconnected state (step S122). The CPU 110 outputs the signal S2 for controlling the SW2 such that it is turned on (step S123). The CPU 110 sends, to the control unit 201A, an instruction for controlling the first charger 200A such that the charging is started (step S124). Thereafter, the CPU 110 returns the process to be executed to the upper-level process, which is the source of summoning, of the charging start control processing.

On the other hand, upon determining that the maximum current value is not 10 A (NO in step S113), that is, when the maximum current value is any one of 16 A, 32A, and 63A, the CPU 110 sends, to the control unit 201A, an instruction for controlling the charging circuit relay 225A of the first charger 200A such that it is switched to the connected state (step S131).

Next, the CPU 110 sends, to the control unit 201B, an instruction for controlling the charging circuit relay 225B of the second charger 200B such that it is switched to the connected state (step S132). The CPU 110 outputs the signal S2 for controlling the SW2 such that it is turned on (step S133). The CPU 110 sends, to the control units 201A, 201B, instructions on controlling the first charger 200A and the second charger 200B, respectively, such that the charging is started (step S134). Thereafter, the CPU 110 returns the process to be executed to the upper-level process, which is the source of summoning, of the charging start control processing.

In this embodiment, each of the first charger 200A and the second charger 200B can handle power rated at 3.3 kW. When the maximum current value is 10 A, the maximum power that can be supplied by the power supply facility 300 is 230 V×10 A=2.3 kW<3.3 kW. For this reason, when the maximum current value is 10 A, any one of the first charger 200A and the second charger 200B can handle the maximum power that can be supplied. For this reason, as described in steps S121 to S124, the power accumulation device 10 is charged using one charger 200A without using the charger 200B.

On the other hand, when the maximum current value is not 10 A, that is, when the maximum current value is 16 A or higher, the maximum power that can be supplied by the power supply facility 300 is 230 V×16 A=3.68 kW>3.3 kW. For this reason, when the maximum current value is 16 A, the first charger 200A and the second charger 200B can together handle the supplied maximum power. For this reason, as described in steps S131 to S134, the power accumulation device 10 is charged using both the chargers 200A, 200B.

Second Embodiment

In the first embodiment, the case where the chargers 200A, 200B are connected in parallel has been described. In the second embodiment, a case where one charger 200C includes a plurality of charging circuits provided in parallel will be described.

Figure 5:
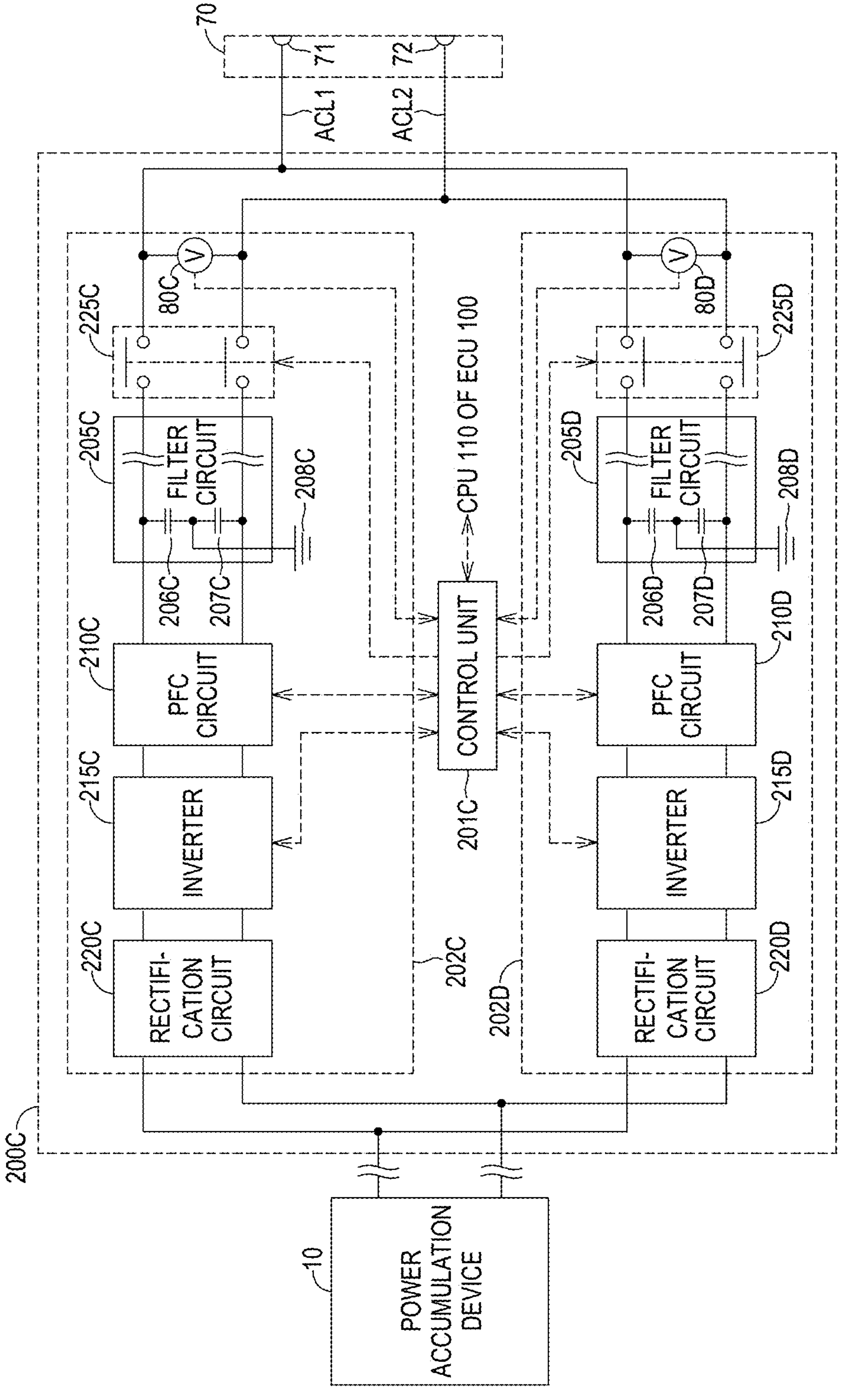
FIG. 5 is a diagram illustrating one example of a circuit configuration when one charger includes a plurality of charging circuits.

FIG. 5 is a diagram illustrating an example of a circuit configuration where one charger 200C includes a plurality of charging circuits. With reference to FIG. 5, the charger 200C includes a plurality (here, two) of charging circuits 202C, 202D, and a control unit 201C that controls the charging circuits 202C, 202D according to instructions from the CPU 110 of the ECU 100. The charging circuits 202C, 202D have a configuration where the control units 201A, 201B are respectively excluded from the chargers 200A, 200B, described in FIG. 3 of the first embodiment.

Figure 6:
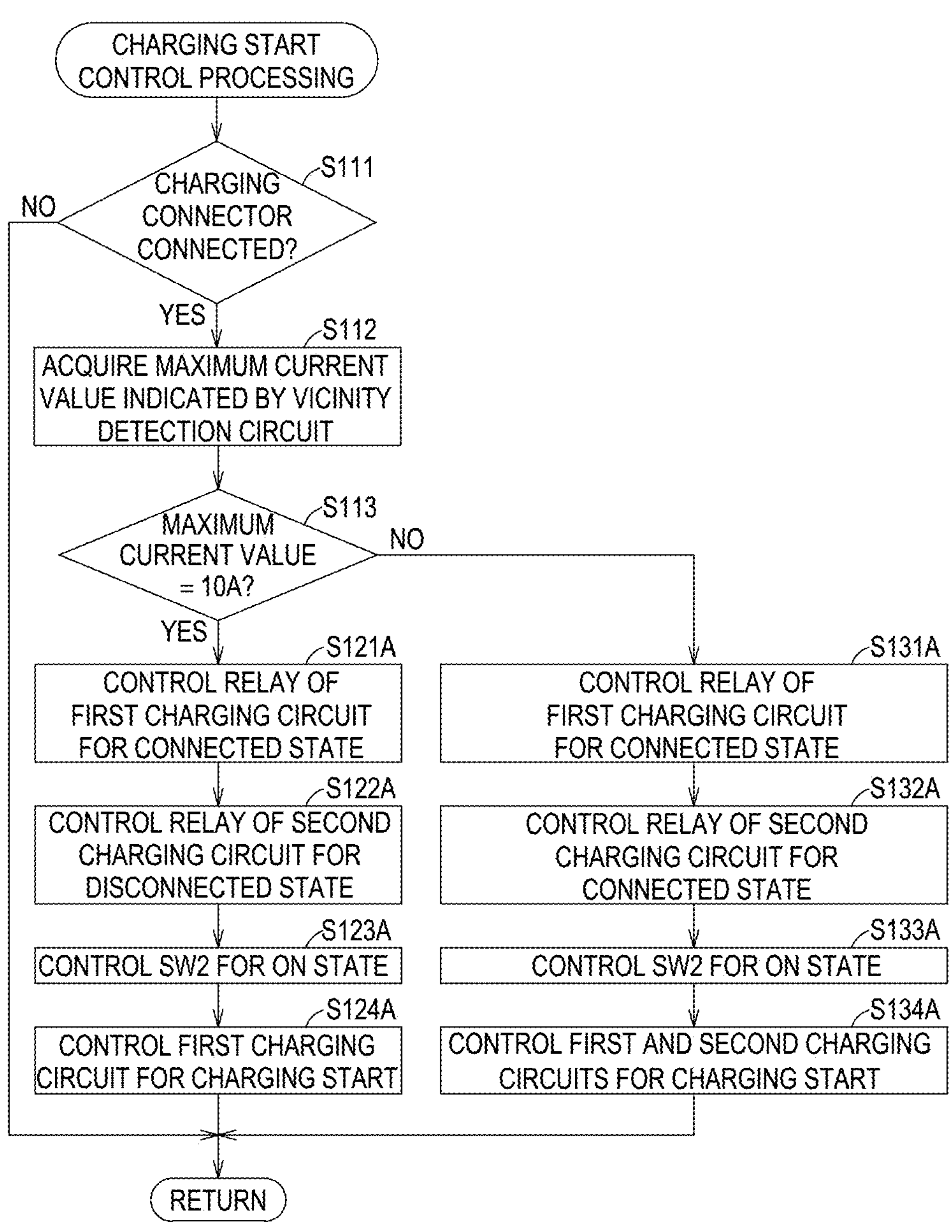
FIG. 6 is a flowchart illustrating a flow of charging start control processing in a second embodiment.

FIG. 6 is a flowchart illustrating a flow of the charging start control processing in a second embodiment. With reference to FIG. 6, since steps S111 to S113 are the same as the charging start control processing of the first embodiment illustrated in FIG. 4, duplicate description will not be repeated.

Upon determining that the maximum current value is 10 A (YES in step S113), the CPU 110 sends, to the control unit 201C, an instruction for controlling a charging circuit relay 225C of the first charging circuit 202C such that it is switched to the connected state (step S121A).

Next, the CPU 110 sends, to the control unit 201C, an instruction for controlling a charging circuit relay 225D of the second charging circuit 202D such that it is switched to the disconnected state (step S122A). The CPU 110 outputs the signal S2 for controlling the SW2 such that it is turned on (step S123A). The CPU 110 sends, to the control unit 201C, an instruction for controlling the first charging circuit 202C such that the charging is started (step S124A). Thereafter, the CPU 110 returns the process to be executed to the higher-level process, which is the source of summoning, of the charging start control processing.

On the other hand, upon determining that the maximum current value is not 10 A (NO in step S113), that is, when the maximum current value is any one of 16 A, 32 A, and 63 A, the CPU 110 sends, to the control unit 201C, an instruction for controlling the charging circuit relay 225C of the first charging circuit 202C such that it is switched to the connected state (step S131A).

Next, the CPU 110 sends, to the control unit 201C, an instruction for controlling the charging circuit relay 225D of the second charging circuit 202D such that it is switched to the connected state (step S132A). The CPU 110 outputs the signal S2 for controlling the SW2 such that it is turned on (step S133A). The CPU 110 sends, to the control unit 201C, an instruction for controlling the first charging circuit 202C and the second charging circuit 202D such that the charging is started (step S134A). Thereafter, the CPU 110 returns the process to be executed to the higher-level process, which is the source of summoning, of the charging start control processing.

In this embodiment, each of the first charging circuit 202C and the second charging circuit 202D can handle power rated at 3.3 kW. When the maximum current value is 10 A, the maximum power that can be supplied by the power supply facility 300 is 230 V×10 A=2.3 kW<3.3 kW. For this reason, when the maximum current value is 10 A, any one of the first charging circuit 202C and the second charging circuit 202D can handle the maximum power that can be supplied. For this reason, as described in steps S121A to S124A, the power accumulation device 10 is charged using one charging circuit 202C without using the charging circuit 202D.

On the other hand, when the maximum current value is not 10 A, that is, when the maximum current value is 16 A or higher, the maximum power that can be supplied by the power supply facility 300 is 230 V×16 A=3.68 kW>3.3 kW. For this reason, when the maximum current value is 16 A, the first charging circuit 202C and the second charging circuit 202D can together handle the supplied maximum power. For this reason, as described in steps S131A to S134A, the power accumulation device 10 is charged using both the charging circuits 202C, 202D.

Third Embodiment

In the first and the second embodiments, a case where the vicinity detection circuit 170 according to the GB/T standard is provided in the vehicle 1, as illustrated in FIG. 2, has been described. In a third embodiment, a case where a vicinity detection circuit 170A is included in the vehicle 1 according to Type 2 of an IEC standard will be described. A circuit configuration excluding the vicinity detection circuit 170A of the third embodiment is the same as those of FIGS. 2 and 3 of the first embodiment.

Figure 7:
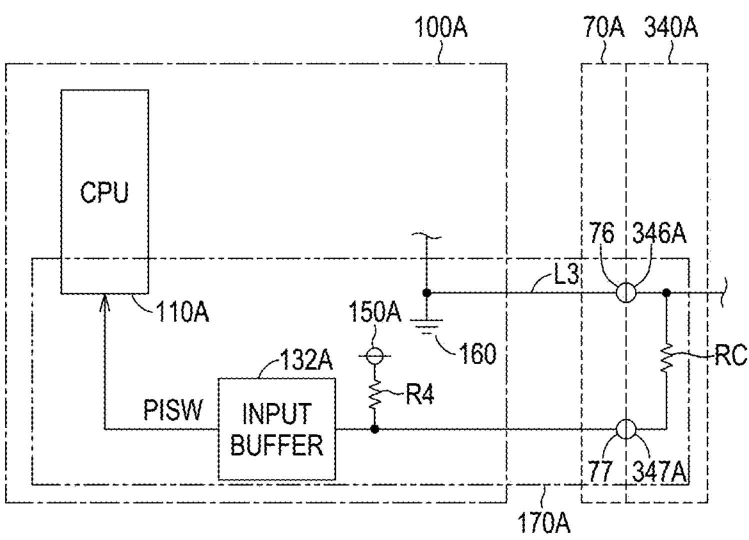
FIG. 7 is a diagram illustrating one example of a circuit configuration of a vicinity detection circuit of a third embodiment.

FIG. 7 is a diagram illustrating an example of a circuit configuration of the vicinity detection circuit 170A of the third embodiment. With reference to FIG. 7, the vicinity detection circuit 170A includes a resistor RC on the power supply facility 300 side, the pull-up resistor R4, a power source node 150A, a input buffer 132A, and a CPU 110A of an ECU 100A on the vehicle 1 side. In the power supply facility 300, the maximum power that can be supplied is determined in advance at the time of designing. In other words, since the supply voltage from the power supply facility 300 is regulated to be a constant value (240 V in a case of Type 2 of the IEC standard), the maximum current value of power supplied to the vehicle 1 via a charging cable 330A and a connector 340A is determined in advance for each power supply facility 300.

In Type 2 of the IEC standard (IEC61851-1), the maximum current value (the capacity of the charging cable 330) that can be supplied from the power supply facility 300 is regulated to be any one of 13 A, 20 A, 32 A, and 70 A in a case of single-phase alternating current, and regulated to be any one of 13 A, 20 A, 32 A, and 63 A in a case of three-phase alternating current. Further, a resistor value of the resistor RC on the power supply facility 300 side is regulated to be a different value for each maximum current value. For this reason, as described above, when the connector 340A is connected to an inlet 70A, the potential V4 of the connector connection signal PISW varies for each maximum current value. The resistor value of the pull-up resistor R4 on the vehicle 1 side is determined to be a constant value.

Therefore, from the potential V4, the vehicle 1 can detect which of 13 A, 20 A, 32 A, and 70 A in the case of single-phase alternating current, and which of 13 A, 20 A, 32 A, and 63 A in the case of three-phase alternating current are the maximum current values that can be supplied from the power supply facility 300.

As such, from the range of the potential V4 of the connector connection signal PISW input from the input buffer 132A, the CPU 110A can detect the maximum current value that can be supplied by the power supply facility 300.

Figure 8:
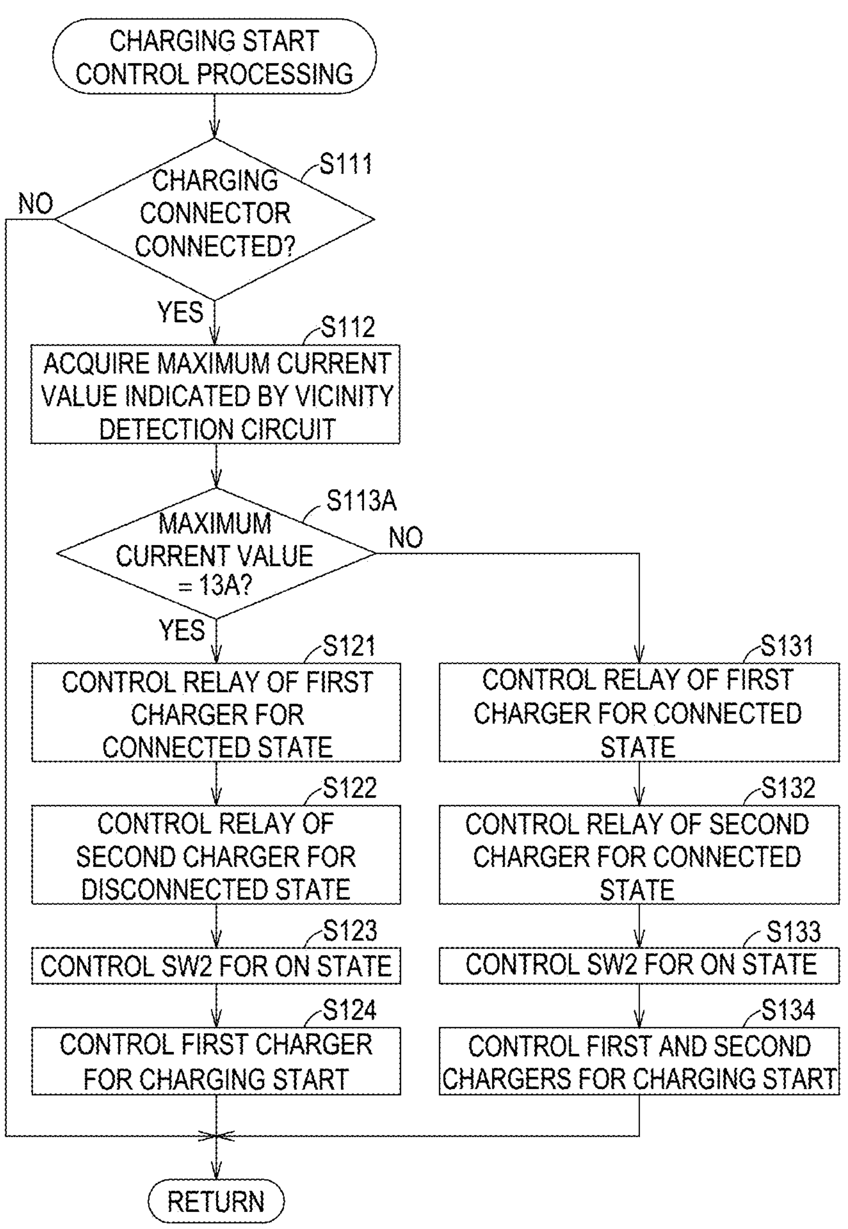
FIG. 8 is a flowchart illustrating a flow of charging start control processing in the third embodiment.

FIG. 8 is a flowchart illustrating a flow of the charging start control processing in the third embodiment. With reference to FIG. 8, since steps S111 and S112 are the same as the charging start control processing of the first embodiment illustrated in FIG. 4, duplicate description will not be repeated.

The CPU 110 determines whether the acquired maximum current value is 13 A (step S113A). Upon determining that the maximum current value is 13 A (YES in step S113A), the CPU 110 executes processes from steps S121 to S124. Since steps S121 to S124 are the same as the charging start control processing of the first embodiment illustrated in FIG. 4, duplicate description will not be repeated.

On the other hand, upon determining that the maximum current value is not 13 A (NO in step S113A), that is, when the maximum current value is any one of 20 A and 32 A, the CPU 110 executes processes from steps S131 to S134. Since steps S131 to S134 are the same as the charging start control processing of the first embodiment illustrated in FIG. 4, duplicate description will not be repeated.

In this embodiment, each of the first charger 200A and the second charger 200B can handle power rated at 3.3 kW. When the maximum current value is 13 A, the maximum power that can be supplied by the power supply facility 300 is 240 V×13 A=3.12 kW<3.3 kW. For this reason, when the maximum current value is 13 A, any one of the first charger 200A and the second charger 200B can handle the maximum power that can be supplied. For this reason, as described in steps S121 to S124, the power accumulation device 10 is charged using one charger 200A without using the charger 200B.

On the other hand, when the maximum current value is not 13 A, that is, when the maximum current value is 20 A or higher, the maximum power that can be supplied by the power supply facility 300 is 240 V×20 A=4.80 kW>3.3 kW. For this reason, when the maximum current value is 20 A, the first charger 200A and the second charger 200B can together handle the supplied maximum power. For this reason, as described in steps S131 to S134, the power accumulation device 10 is charged using both the chargers 200A, 200B.

Fourth Embodiment

In the first to the third embodiments, the case where the number of chargers or charging circuits provided in parallel is two has been described. In a fourth embodiment, a case where the number of chargers or charging circuits that are provided in parallel is three or higher will be described. Although the case where the number of chargers provided in parallel is three or higher will be described in the fourth embodiment, as described in the first and the second embodiments, the same applies to the case where the number of charging circuits provided in parallel in one charger is three or higher.

Figure 9:
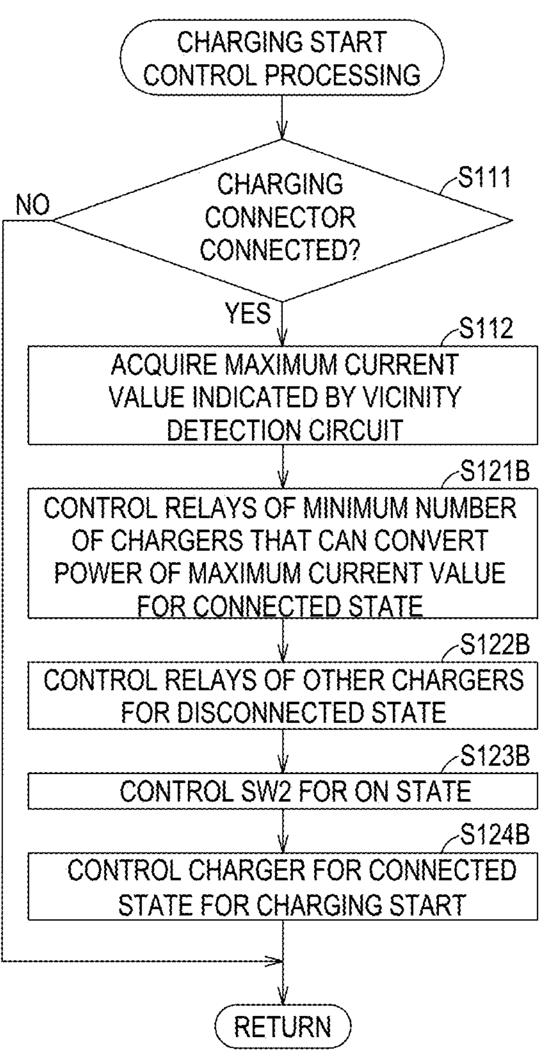
FIG. 9 is a flowchart illustrating a flow of charging start control processing in a fourth embodiment.

FIG. 9 is a flowchart illustrating a flow of the charging start control processing in the fourth embodiment. With reference to FIG. 9, since steps S111 and S112 are the same as the charging start control processing of the first embodiment illustrated in FIG. 4, duplicate description will not be repeated.

The CPU 110 specifies the minimum number of chargers that can convert power of the acquired maximum current value, and sends, to the control unit of the corresponding charger, an instruction for controlling the charging circuit relays of the specified number of chargers such that they are switched to the connected state (step S121B).

When each charger can handle power rated at a(kW), the acquired maximum current value is b(A), and the supply voltage is c(V), the maximum power value that can be supplied by the power supply facility 300 is c(V)×b(A)=b·c (kW). The minimum number d of chargers that can convert power having the maximum current value is a minimum integer equal to or higher than b·c/a.

Next, the CPU 110 sends, to the control unit of the corresponding charger, an instruction for controlling the charging circuit relays of the other chargers such that they are switched to the disconnected state (step S122B).

The CPU 110 outputs the signal S2 for controlling the SW2 such that it is turned on (step S123B). The CPU 110 sends, to the control unit of the corresponding charger, an instruction for controlling the charger of which the charging circuit relay is controlled such that it is switched to the connected state for the charging start (step S124B). Thereafter, the CPU 110 returns the process to be executed to the upper-level process, which is the source of summoning, of the charging start control processing.

As such, it is possible to charge the power accumulation device 10 using the minimum number of chargers that can handle power having the maximum current value that can be supplied by the power supply facility 300.

Other Modified Examples (1) In the above-described embodiment, as illustrated in FIG. 1 and the like, the vehicle 1 is assumed to be a BEV. However, the type of the vehicle 1 is not limited thereto, and is a vehicle chargeable from the outside and may be a plug-in hybrid electric vehicle (hereinafter, also referred to as a "PHEV"), or may be a fuel cell electric vehicle (hereinafter, also referred to as an "FCEV"). When the vehicle 1 is a PHEV, the drive force output device 40 may include, for example, an engine, in addition to a motor.

(2) In the above-described embodiment, as illustrated in FIGS. 3 and 5, the switching system that switches between the states where each of the charging circuits and the inlet 70 are electrically connected and disconnected is the charging circuit relays 225A, 225B, which are two A-contact relays each having two poles, in FIG. 3, and the charging circuit relays 225C, 225D, which are two A-contact relays each having two poles, in FIG. 5.

However, the switching system is not limited thereto, and, in FIG. 3, it may be composed of a C-contact relay having two poles, that is, one pole connected to the input line ACL1 of the charging circuit relay 225A and the charging circuit relay 225B and one pole connected to the input line ACL2 of the charging circuit relay 225A and the charging circuit relay 225B. In the same manner, in FIG. 5, the switching system may also be composed of a C-contact relay. Alternatively, it may be composed of a B-contact relay instead of the A-contact relay.

(3) In the above-described embodiment, as illustrated in FIGS. 3 and 5, it is assumed that the first charger 200A and the first charging circuit 202C are provided with the charging circuit relays 225A, 225C, respectively. However, the present disclosure is not limited thereto, and the first charger 200A and the first charging circuit 202C are not provided with the charging circuit relays 225A, 225C, respectively, as main charging circuits, and the second charger 200B and the second charging circuit 202D, which are the other charging circuits, may be provided with the charging circuit relays 225B, 225D, respectively, as secondary charging circuits.

As illustrated in FIGS. 4 and 6, when the power accumulation device 10 is charged, the second charger 200B and the second charging circuit 202D are switched to the connected or the disconnected state depending on the situation. On the other hand, when the power accumulation device 10 is charged, the first charger 200A and the first charging circuit 202C are always switched to the connected state. For this reason, no problem arises even when the first charger 200A and the first charging circuit 202C do not include the charging circuit relays 225A, 225C, respectively.

(4) In the above-described embodiment, as illustrated in FIGS. 4 and 6, when the power accumulation device 10 is charged, the second charger 200B and the second charging circuit 202D are switched to the connected or the disconnected state depending on the situation. On the other hand, when the power accumulation device 10 is charged, it is assumed that the first charger 200A and the first charging circuit 202C are always switched to the connected state.

However, the present disclosure is not limited thereto, and when the power accumulation device 10 is charged and the supply power can be handled by one charger, the first charger 200A and the second charger 200B may be alternately disconnected, or the first charging circuit 202C and the second charging circuit 202D may be alternately disconnected. Specifically, when the first charger 200A and the first charging circuit 202C are switched to the disconnected state during certain charging, the second charger 200B and the second charging circuit 202D may be switched to the disconnected state, respectively, during next charging. Being alternate is not limited to being alternate every one time, and may be alternate every plurality of times.

(5) The above-described embodiments can be regarded as a disclosure of the vehicle 1, can be regarded as a disclosure of the charging system of the vehicle 1 composed of a plurality of chargers 200A, 200B as illustrated in FIG. 3, can be regarded as a disclosure of the charging system of the vehicle 1 composed of the charger 200C including the charging circuits 202C, 202D, can be regarded as a disclosure of the control device of the charging system composed of the ECU 100 and the control units 201A, 201B, and can be regarded as a disclosure of the control device of the charging system composed of the ECU 100 and the control unit 201C, as illustrated in FIG. 5.

SUMMARY (1) As illustrated in FIGS. 1, 2, and the like, the vehicle 1 is a vehicle chargeable from the outside. As illustrated in FIGS. 1 to 3, 5, and 7, the vehicle 1 includes the inlet 70 connected to the connector 340 of the charging cable 330 that supplies power from the outside, a power accumulation device 10 that accumulates power, two or more charging circuits (for example, the chargers 200A, 200B as charging circuits of FIG. 3 and the charging circuits 202C, 202D of the charger 200C of FIG. 5) that convert power from the inlet 70 into direct current power having a predetermined voltage adapted for the power accumulation device 10, the switching system (for example, a system that combines the charging circuit relays 225A and 225B of FIG. 3, a system that combines the charging circuit relays 225C and 225D of FIG. 5, and a system composed of a B-contact relay or a C-contact relay instead of the A-contact relay of FIGS. 3 and 5, as described above) that switches the states where each of the charging circuits and the inlet 70 are electrically connected and disconnected, the control device (may be, for example, a control device composed of the ECU 100 and the control units 201A, 201B as illustrated in FIGS. 2 and 3, or the control device composed of the ECU 100 and the control unit 201C as illustrated in FIGS. 2 and 5) that controls the switching system, and the detection circuit (for example, the vicinity detection circuit 170 of FIG. 2 or the vicinity detection circuit 170A of FIG. 7) that detects the maximum current value of the charging power supplied from the outside. As illustrated in FIGS. 4, 6, 8, and 9, the control device controls the switching system such that the minimum number of charging circuits that can convert power having the maximum current value detected by the detection circuit becomes the state of being electrically connected to the inlet 70.

As such, the minimum number of charging circuits that can convert the charging power having the maximum current value supplied from the outside becomes the state of being electrically connected to the inlet 70. For this reason, it is possible to restrict leakage current even in the case where the Y-capacitors 206A to 206D and 207A to 207D are provided in the power line connected to the charging circuit, as compared with the case where all of the charging circuits are electrically connected to the inlet 70. As a result, it is possible to restrict leakage current even when the Y-capacitors 206A to 206D and 207A to 207D are provided.

It is also conceivable that, at the beginning of the charging, the charging is executed using a small number (for example, one) of charging circuits and the charging is executed using a large number (for example, two or higher) of charging circuits during the charging. However, when the charging circuit relays 225A to 225D are switched during the charging, failure may occur. For this reason, it is necessary to switch the charging circuit relays 225A to 225D after turning off the switch SW2 described in FIG. 2. As such, depending on the power supply facility 300, there is a risk that the charging cannot be started again.

Therefore, as in the above-described embodiment, the minimum number of charging circuits that can handle the maximum current value that can be supplied by the power supply facility 300 is in a state of being electrically connected to the inlet 70 from the beginning. As such, a situation where the charging circuit relays 225A to 225D are switched from the disconnected state to the connected state during the charging to increase the number of charging circuits provided in parallel does not occur. As a result, it is possible to avoid the risk of being unable to start the charging again.

(2) As illustrated in FIG. 3, the vehicle 1 may further include the chargers 200A, 200B each including one charging circuit. As such, since existing chargers 200A, 200B can be used, it is possible to shorten a development period.

(3) As illustrated in FIG. 5, the vehicle 1 may further include one charger 200C including all charging circuits 202C, 202D. As such, it is possible to include an appropriate charger 200C according to the vehicle 1.

(4) As illustrated in FIGS. 3 and 5, the switching system may include a plurality of charging circuit relays 225A to 225D that are provided respectively corresponding to the charging circuits and are configured to switch between the states where each of the charging circuits and the inlet 70 are electrically connected and disconnected. As such, when the power accumulation device 10 is charged, as illustrated in FIG. 9, by alternately switching the relays to the disconnected state, it is possible to make the frequency of use of each of the plurality of charging circuits approximately the same.

(5) As described in the above-described other modified examples, one of the charging circuits may be the main charging circuit and the others may be the secondary charging circuits, and the switching system may include one or more relays provided respectively corresponding to the secondary charging circuits and switching between the states where each of the charging circuits and the inlet 70 are electrically connected and disconnected. As such, it is possible to eliminate a need to provide a relay in the main charging circuit. As a result, it is possible to reduce a cost of providing the relay.

The embodiment disclosed herein needs to be considered as illustrative in all points and not restrictive. The scope of the present disclosure is shown not by the above description of the embodiments but by the claims, and is intended to include meanings equivalent to the claims and all modifications within the scope thereof.

What is claimed is:

1. A vehicle chargeable from an outside, the vehicle comprising:

an inlet configured to be connected to a connector of a cable that supplies power from the outside;

a power accumulation device configured to accumulate power;

two or more charging circuits configured to convert power from the inlet into direct current power having a predetermined voltage adapted for the power accumulation device, wherein each of the two or more charging circuits includes a Y-capacitor for filtering out common mode noise;

a switching system configured to switch between states where each of the charging circuits and the inlet are electrically connected and disconnected;

a control device configured to control the switching system; and a detection circuit configured to detect a maximum current value of charging power supplied from the outside, wherein the control device is configured to control the switching system such that the minimum number of charging circuits that are able to convert power having the maximum current value detected by the detection circuit is in a state of being electrically connected to the inlet.

2. The vehicle according to claim 1, further comprising a plurality of chargers, wherein each charger comprises one charging circuit of the two or more charging circuits.

3. The vehicle according to claim 1, further comprising one charger comprising all of the two or more charging circuits.

4. The vehicle according to claim 1, wherein the switching system includes a plurality of relays provided respectively corresponding to the charging circuits and configured to switch between states where each of the charging circuits and the inlet are electrically connected and disconnected.

5. The vehicle according to claim 1, wherein:

one of the charging circuits is a main charging circuit and the others are secondary charging circuits; and the switching system includes one or more relays provided respectively corresponding to each of the secondary charging circuits and configured to switch between the states where each of the secondary charging circuits and the inlet are electrically connected and disconnected from the main charging circuit.

6. The vehicle according to claim 1, wherein each of the two or more charging circuits includes:

the Y-capacitor connected to a first bus; and a second Y-capacitor connected to a second bus, wherein a node connected to a ground voltage is connected between the Y-capacitor and the second Y-capacitor.

7. The vehicle according to claim 1, wherein the detection circuit is configured to detect the maximum current value based on a potential of a connector connection signal received when the connector is connected to the inlet.

8. The vehicle according to claim 1, wherein the control device is configured to maintain the minimum number of charging circuits in the state of being electrically connected to the inlet throughout a charging operation without switching additional charging circuits to the state of being electrically connected to the inlet during the charging operation.

9. The vehicle according to claim 1, wherein the maximum current value detected by the detection circuit represents a predetermined capacity of the cable that supplies power from the outside.

10. A charging system of a vehicle chargeable from an outside, the vehicle including an inlet configured to be connected to a connector of a cable that supplies power from the outside, and a power accumulation device configured to accumulate power, the charging system comprising:

two or more charging circuits configured to convert power from the inlet into direct current power having a predetermined voltage adapted for the power accumulation device, wherein each of the two or more charging circuits includes a Y-capacitor for filtering out common mode noise;

a switching system configured to switch between states where each of the charging circuits and the inlet are electrically connected and disconnected;

a control device configured to control the switching system; and a detection circuit configured to detect a maximum current value of charging power supplied from the outside, wherein the control device is configured to control the switching system such that the minimum number of charging circuits that are able to convert power having the maximum current value detected by the detection circuit is in a state of being electrically connected to the inlet.

11. The charging system according to claim 10, wherein each of the two or more charging circuits includes:

the Y-capacitor connected to a first bus; and a second Y-capacitor connected to a second bus, wherein a node connected to a ground voltage is connected between the Y-capacitor and the second Y-capacitor.

12. The charging system according to claim 10, wherein the detection circuit is configured to detect the maximum current value based on a potential of a connector connection signal received when the connector is connected to the inlet.

13. The charging system according to claim 10, wherein the control device is configured to maintain the minimum number of charging circuits in the state of being electrically connected to the inlet throughout a charging operation without switching additional charging circuits to the state of being electrically connected to the inlet during the charging operation.

14. The charging system according to claim 10, wherein the maximum current value detected by the detection circuit represents a predetermined capacity of the cable that supplies power from the outside.

15. A control device of a charging system of a vehicle chargeable from an outside, the vehicle including an inlet configured to be connected to a connector of a cable that supplies power from the outside, and a power accumulation device configured to accumulate power, and the charging system including two or more charging circuits configured to convert power from the inlet into direct current power having a predetermined voltage adapted for the power accumulation device, wherein each of the two or more charging circuits includes a Y-capacitor for filtering out common mode noise, a switching system configured to switch between states where each of the charging circuits and the inlet are electrically connected and disconnected, and a detection circuit configured to detect a maximum current value of charging power supplied from the outside, the control device comprising:

an electronic control unit configured to control the switching system such that the minimum number of charging circuits that are able to convert power having the maximum current value detected by the detection circuit is in a state of being electrically connected to the inlet.

16. The control device according to claim 15, wherein each of the two or more charging circuits includes:

the Y-capacitor connected to a first bus; and a second Y-capacitor connected to a second bus, wherein a node connected to a ground voltage is connected between the Y-capacitor and the second Y-capacitor.

17. The control device according to claim 15, wherein the detection circuit is configured to detect the maximum current value based on a potential of a connector connection signal received when the connector is connected to the inlet.

18. The control device according to claim 15, wherein the electronic control unit is configured to maintain the minimum number of charging circuits in the state of being electrically connected to the inlet throughout a charging operation without switching additional charging circuits to the state of being electrically connected to the inlet during the charging operation.

19. The control device according to claim 15, wherein the maximum current value detected by the detection circuit represents a predetermined capacity of the cable that supplies power from the outside.

* * * * *